US006900844B2

(12) United States Patent
Itaki et al.

(10) Patent No.: US 6,900,844 B2
(45) Date of Patent: May 31, 2005

(54) DISPLAY CONTROL METHOD FOR VIDEO DISPLAY SYSTEM AND VIDEO DISPLAY SYSTEM

(75) Inventors: Youichi Itaki, Tokyo (JP); Kouichi Ara, Tokyo (JP); Satoshi Wakasugi, Tokyo (JP); Michio Tomizawa, Tokyo (JP); Atsuhiko Saitou, Tokyo (JP)

(73) Assignee: NEC Corporation, Tokyo (JP)

( * ) Notice: Subject to any disclaimer, the term of this patent is extended or adjusted under 35 U.S.C. 154(b) by 455 days.

(21) Appl. No.: 09/818,720

(22) Filed: Mar. 27, 2001

(65) Prior Publication Data

US 2001/0026326 A1 Oct. 4, 2001

(30) Foreign Application Priority Data

Mar. 28, 2000 (JP) ........................................ 2000-089411

(51) Int. Cl.[7] .............................. H04N 5/66; H04N 9/12; H04N 3/46
(52) U.S. Cl. ........................ 348/383; 348/588; 348/739; 348/744; 445/1.1; 445/1.3
(58) Field of Search ................................ 348/383, 558, 348/588, 721, 739, 744, 750, 445; 345/1.1–1.3, 3.1–3.3; H04N 5/66, 9/12, 3/46

(56) References Cited

U.S. PATENT DOCUMENTS

| | | | | | |
|---|---|---|---|---|---|
| 5,068,740 | A | * | 11/1991 | Brody | 348/383 |
| 6,122,000 | A | * | 9/2000 | Yee et al. | 348/51 |
| 6,181,300 | B1 | * | 1/2001 | Poon et al. | 345/698 |
| 6,340,994 | B1 | * | 1/2002 | Margulis et al. | 348/625 |
| 6,377,251 | B1 | * | 4/2002 | Takasu et al. | 345/204 |
| 6,456,335 | B1 | * | 9/2002 | Miura et al. | 348/588 |
| 6,501,441 | B1 | * | 12/2002 | Ludtke et al. | 345/1.1 |
| 6,583,771 | B1 | * | 6/2003 | Furuhashi et al. | 345/1.1 |
| 6,611,241 | B1 | * | 8/2003 | Firester et al. | 345/1.3 |
| 6,621,500 | B1 | * | 9/2003 | Alcorn et al. | 345/629 |
| 2001/0013843 | A1 | * | 8/2001 | Fujiwara et al. | 345/1.2 |

FOREIGN PATENT DOCUMENTS

| | | |
|---|---|---|
| JP | 5-145866 | 6/1993 |
| JP | 8-88820 | 4/1996 |
| JP | 10-243322 | 9/1998 |
| JP | 2000-20042 | 1/2000 |
| JP | 2000-32367 | 1/2000 |
| JP | 2000-338941 | 8/2000 |
| JP | 2000-276099 | 10/2000 |
| JP | 2000-092408 | 3/2001 |
| JP | 2001-092408 | 4/2001 |
| JP | 2001-272723 | 5/2001 |

* cited by examiner

*Primary Examiner*—Michael H. Lee
*Assistant Examiner*—Brian P. Yenke
(74) *Attorney, Agent, or Firm*—Scully, Scott, Murphy & Presser

(57) ABSTRACT

A video display system comprising a plurality of video display apparatuses 11 to 13 for displaying video signals Sv being supplied as video. A specific video display apparatus 11 out of a plurality of the video display apparatuses 11 to 13 discriminates video characteristics Pv1 to Pv5 of the video signal Sv to output identification signals IDa to IDd that correspond to the discriminated video characteristics (Pa1 to Pa5) to (Pd1 to Pd5) and simultaneously displays the video signal Sv according to the display characteristic characteristics (Qa1 to Qa3) to (Qc1 to Qc3) stored in correspondence to the identification signals IDa to IDd. The other video display apparatuses 12 and 13 than the specific video display apparatus 11 display the video signals Sv according to the display characteristic characteristics (Qa1 to Qa3) to (Qc1 to Qc3) stored in correspondence to the identification signals IDa to IDd.

47 Claims, 8 Drawing Sheets

| SIGNAL IDENTIFICATION CODE | FREQUENCY DIVIDING RATIO | HORIZONTAL DISPLAY WIDTH | VERTICAL DISPLAY WIDTH |
|---|---|---|---|
| IDa | Qa1=1/120 | Qa2=80% | Qa3=80% |
| IDb | Qb1=1/100 | Qb2=100% | Qb3=100% |
| IDc | Qc1=1/80 | Qc2=90% | Qc3=100% |
| IDd | Qd1=1/60 | Qd2=90% | Qd3=90% |

| | FREQUENCY DIVIDING RATIO | HORIZONTAL DISPLAY WIDTH | VERTICAL DISPLAY WIDTH |
|---|---|---|---|
| VIDEO SIGNAL Sv | Qv1=1/100 | Qv2=100% | Qv3=100% |

DISPLAY CONTROL METHOD FOR VIDEO DISPLAY SYSTEM AND VIDEO DISPLAY SYSTEM

BACKGROUND OF THE INVENTION

The present invention relates to a display control method for a video display system and a video display system, and more particularly to a system for displaying video signals being supplied in a plurality of video display apparatuses, wherein display patterns of video of all the video display apparatuses are made to accord completely.

Conventionally, using the various video display elements such as a CRT (cathode-ray tube), a LCD (liquid crystal display), a PDP (plasma display panel), a DMD (digital micro-mirror device: the trademark of U.S. Texas Instruments Ltd.), the various video display apparatuses exist for displaying video produced by these video display elements on a picture surface.

As one kind of theses video display apparatuses the video display system exists in which a plurality of the video display apparatuses are arranged on the same plane to constitute the system and video of each of the video display apparatuses is combined to be displayed. The system concerned is utilized in case of materializing display for a big picture surface, display for a large number of split picture surfaces and the like.

The multi-panel display system is disclosed in JP-A-88820/1996, and the art described in the laid-open patent publication now will be explained as an example of the prior art.

FIG. 8A is an entire circuit block diagram illustrating the multi-panel display system according to the example of the prior art, and FIG. 8B is a circuit block diagram illustrating a master unit in the multi-panel display system of FIG. 8A.

The multi-panel display system shown in FIG. 8A comprises a system controller 501, a master unit 502 and slave units 503.

The master unit 502 shown in FIG. 8B comprises a video selector 521, a video processor 522, a PDP 523 and a controller 524.

When an input video signal, a display position and a size of the picture surface are designated by the system controller 501, the controller 524 of the master unit 502 selects input video in the video selector 521 in correspondence to said designation and carries out video processes such as expansion of the designated position and the like to display on the PDP 523.

The controller 524 of the master unit 502 further transmits control signals to each of the slave unit 503 via a control bus CI.

Each of the slave units 503 receives said control signals and carries out an expansion processing for the designated part of video of the input video signals in correspondence to the control signals and the like to display.

The art concerned is the art for controlling the expansion processing for some of video being displayed on each of the slave units by an instruction of the master units 502 and the like, which is not related to the control method for the display pattern in accordance with the present invention.

Additionally, the display apparatus for the multi-channel and split-picture surfaces is disclosed in JP-A-88820/2000, but the art concerned which also concerns the method for splitting the picture surface in a similar manner to said example of the prior art is not related to the control method of the display pattern in accordance with the present invention.

As with the multi-panel display system in accordance with said example of the prior art, it is disclosed neither as the problem to be solved nor as means to solve the problem to switch over the display patterns such as display widths being in horizontal/vertical directions in the PDP 523 and the like in correspondence to change in video characteristics such as a frequency and a polarity of horizontal/vertical synchronizing components and the like.

Hence, it is virtualized that in the multi-panel display system in accordance with said example of the prior art the above-mentioned processing can be realized by integrating in the master unit 502 and each of the slave units 503 a discriminating circuit of the video characteristics respectively of which each discriminates the video characteristics respectively to switch over if realization thereof is intended.

However, drawbacks to the virtual art included the following.

Firstly, there was the problem that variations in the times until which displaying video begins from this switching operation occurred among the master unit 502 and each of the slave units 503 when input video signals were switched over.

The reason is that the discriminating circuit of the video characteristics integrated in the master unit 502 and each of slave units 502 respectively judged the video characteristics independently and thereby the timing were not made to be synchronized at which the display patterns of the input video signals were switched over in accordance to these judged video characteristics.

Secondly, there were the problems that the different display patterns were displayed in some of the master unit 502 and the slave units 503, for example only one part of the picture surface was reduced to be displayed, some were displayed as pulled out of synchronization and the like when the input video signals were switched over.

The reason is that the master unit 502 and the slave units 502 were impossible to control so that all of the display patterns thereof always accorded, because the discriminating circuits of the video characteristics integrated in the master unit 502 and each of the slave units 503 respectively differed in operating principles, because the parameter ranges that were set as criteria for discrimination were different from each other even though the operating principles of the discriminating circuits for the video characteristics were the same, and because discrepancy between the parameter ranges occurred due to aged deterioration and the like.

SUMMARY OF THE INVENTION

The present invention is made to solve the above-mentioned problems.

Moreover, an objective of the present invention is to provide a display control method for a video display system and a video display system that can control so that display patterns of a plurality of video display apparatuses accord always.

The objective of the present invention is achieved by the display control method for the video display system comprising a plurality of video display apparatus for displaying the video signals being supplied as video, the display control method including: a step in which a specific video display apparatus out of said plurality of video display apparatuses discriminates video characteristics of said video signals to output identification signals that correspond to the discriminated video characteristics and simultaneously displays said video signals according to display characteristics stored in correspondence to said identification signals; and a step in which said other video display apparatuses than said specific video display apparatus display said video signals according to the display characteristics stored in correspondence to said identification signals.

Furthermore, the objective of the present invention is achieved by the video display system comprising a plurality of the video display apparatus for displaying the video signals being supplied as video, wherein a specific video display apparatus out of a plurality of the video display apparatuses includes: a discriminator for discriminating the video characteristics of said video signals to output the identification signals that correspond to the discriminated video characteristics; and a controller for displaying said video signals according to the display characteristics stored in correspondence to said identification signals, and wherein said other video display apparatuses than said specific video apparatus includes the controller for displaying said video signals according to said display characteristics stored in correspondence to said identification signals.

Furthermore, the objective of the present invention is achieved by the video display system comprising a plurality of the video display apparatus for displaying the video signals being supplied as video, wherein each of a plurality of the video display apparatuses includes: a detector for detecting the video characteristics of said video signals; a memory section of a video characteristic in which the video characteristics that are to be criteria and said identification signals have been stored correspondingly; a memory section of a display characteristic in which said identification signals and said display characteristics have been stored correspondingly; a display controller for discriminating said identification signals that correspond to the video characteristics detected in said detector in reference to said memory section of a video characteristic to read out said display characteristics that corresponds to said discriminated identification signals in reference to said memory section of a display characteristic; and an indicator for displaying said video signals according to the display characteristics read out in said display controller, wherein a specific video display apparatus out of said plurality of video display apparatuses detects the video characteristics of said video signals in said detector and read outs the identification signals that correspond to said detected video characteristics from the memory section of a display characteristic to output to the other video display apparatus and simultaneously displays said video signals according to the display characteristics stored in correspondence to said identification signals, and wherein said other apparatuses read out said display characteristics that correspond to said identification signals output from said the memory section of a display characteristic to display the video signals according to these display characteristics.

A feature of the display control method for the video display system in accordance with the present invention relates to the display control method for the video display system comprising a plurality of video display apparatuses (11 to 13) for displaying video signals (Sv in FIG. 1) being supplied as video, wherein a specific video display apparatus (11) out of said plurality of video display apparatuses (11 to 13) discriminates the video characteristics (Pv1 to Pv5) of said video signals (Sv) to output identification signals (IDa to IDd) that correspond to said discriminated video characteristics ((Pa1 to Pa5) to (Pd1 to Pd5)) and simultaneously displays said video signals (Sv) according to the display characteristics ((Qa1 to Qa3) to (Qc1 to Qc3)) stored in correspondence to said identification signals (IDa to IDd), and wherein said other video display apparatuses (12 and 13) than said specific video display apparatus (11) display said video signals (Sv) according to display the characteristic characteristics ((Qa1 to Qa3) to (Qc1 to Qc3)) stored in correspondence to said identification signals (IDa to IDd).

A feature of the video display system in accordance with the present invention relates to the display control method for the video display system comprising a plurality of video display apparatuses (11 to 13) for displaying the video signals (Sv in FIG. 1) being supplied as video, wherein a specific video display apparatus (11) out of said plurality of video display apparatuses (11 to 13) discriminates the video characteristics (Pv1 to Pv5) of said video signals (Sv) to output the identification signals (IDa to IDd) that correspond to said discriminated video characteristics ((Pa1 to Pa5) to (Pd1 to Pd5)) and simultaneously displays said video signals (Sv) according to the display characteristics ((Qa1 to Qa3) to (Qc1 to Qc3)) stored in correspondence to said identification signals (IDa to IDd), and wherein said other video display apparatuses (12 and 13) than said specific video display apparatus (11) display said video signals (Sv) according to the display characteristics ((Qa1 to Qa3) to (Qc1 to Qc3)) stored in correspondence to said identification signals (IDa to IDd).

By employing such means, the display control method for the video display system and the video display system in accordance with the present invention is such that the display patterns of all of the video display apparatuses are made to always accord because one specific video display apparatus discriminates classifications of the video signals to comprehensively control the display patterns of the other video display apparatuses.

BRIEF DESCRIPTION OF THE DRAWINGS

This and other objects, features and advantages of the present invention will become more apparent upon a reading of the following detailed and drawings, in which.

DESCRIPTION OF THE EMBODIMENTS

Figure 1:
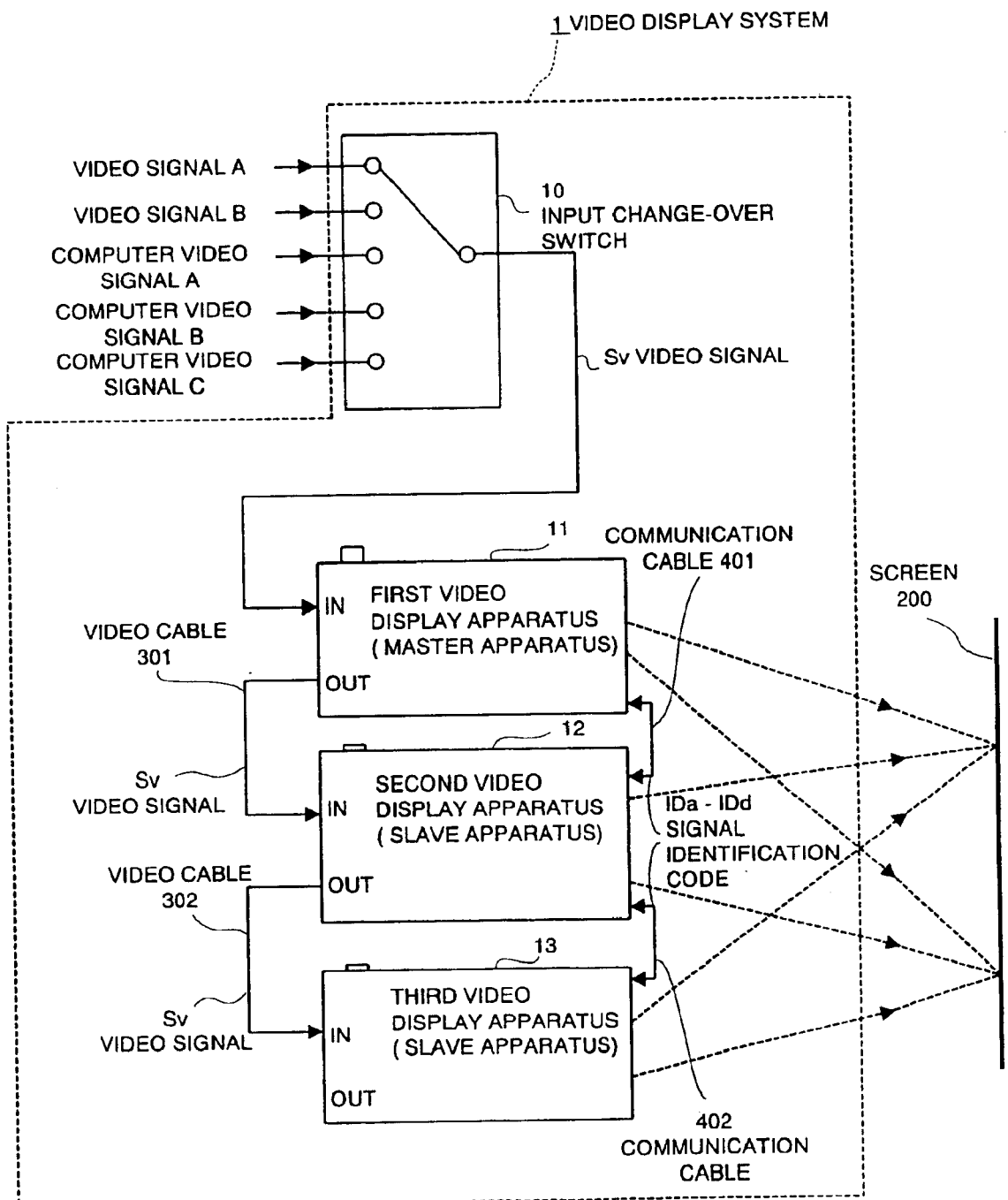
FIG. 1 is an entire circuit block diagram illustrating the video display system in accordance with one embodiment of the present invention.
Figure 2:
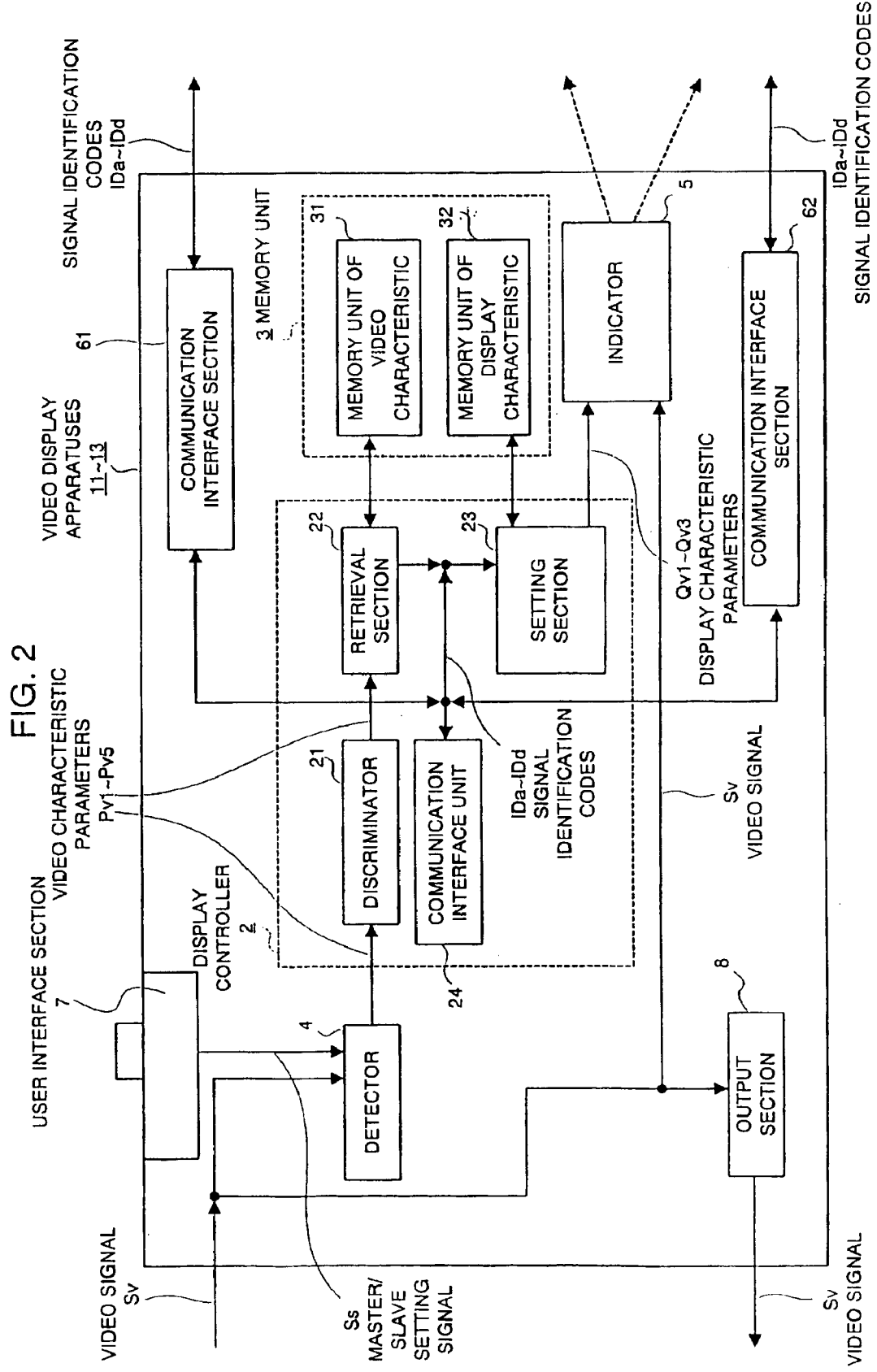
FIG. 2 is a circuit block diagram illustrating the video display apparatus in the video display system in accordance with one embodiment of FIG. 1.

FIG. 1 is a circuit block diagram illustrating the video display system in accordance with one embodiment of the present invention. The video display system shown in FIG. 1 comprises an input change-over switch 10 for selecting video signals from a plurality of input sources to output as the video signals Sv, a first to a third video display apparatuses 11 to 13 for displaying the video signals Sv, a screen 200 on which video produced in the first to the third video display apparatuses are combined to be projected, video cables 301 and 302 for transmitting the video signals Sv and communication cables 401 and 402 for transmitting signal identification codes IDa to IDd FIG. 2 is a circuit block diagram illustrating the video display apparatus in the video display system in accordance with one embodiment of FIG. 1. Each of the first to the third video display apparatuses 11 to 13 shown in FIG. 2 includes a display controller 2, a memory section 3, a detector 4, an indicator 5, communication interface sections 61 and 62, a user interface section 7 and an output section 8 respectively.

The display controller 2 comprising control means such as a CPU and the like discriminates the signal identification code IDa to IDd of the video signals Sv based on the video characteristic parameters Pv1 to Pv5 of the video signals detected in the detector 4 to output the display characteristic parameters Q v a 1 to Qv3.

The memory section 3 comprises a memory circuit and the like in which the signal identification codes IDa to IDd, the video characteristics (Pa1 to Pa5) to (Pd1 to Pd5) (FIG. 3) and the display characteristic parameters (Qa1 to Qa3) to (Qd1 to Qd3) (FIG.4) are stored correspondingly in advance.

The detector 4 detects the video characteristic parameters Pv1 to Pv5 of the video signals Sv being supplied from an external unit.

The indicator 5 comprising a display module, a projection equipment and the like employing the various video display elements such as a CRT (cathode-ray tube), a LCD (liquid crystal display), a PDP (plasma display panel), a DMD (digital micro-mirror device: the trademark of U. S. Texas Instruments Inc.) and the like displays the video signals Sv as video according to the display characteristic parameters (Qv1 to Qv3) from the display controller 2.

The communication interface sections 61 and 62 comprising the various kinds of the interfaces such as a serial interface controller, a parallel interface controller and the like exchange the signal identification codes IDa to IDd with the other video display apparatuses 12,13 and the like.

The user interface section 7 comprises setting switches mounted on each of the chassis of the video display apparatuses 11 to 13 and the like in which various information such as master/slave set signals Ss and the like that set each of the video display apparatuses 11 to 13 for activating as anyone out of the mater apparatus and the slave apparatuses is set by an operator.

The output section 8 comprising a video buffer amplifier and the like amplifies the video signals Sv to output. Said display controller 2 further comprises a discriminator 21, a retrieval section 22, a setting section 23 and a communication interface section 24.

The discriminator 21 discriminates which of video characteristic parameters Pv1 to Pv5 from the detector 4 has changed. In case of discriminating any change, the video characteristic parameters Pv1 to Pv5 are supplied to the retrieval section 22.

What are herein called the video characteristic parameters Pv1 to Pv5, (Pa1 to Pa5) to (Pd1 to Pd5) (FIG. 3), specifically, represent the various kinds of parameters used for specifying classifications of the video signals Sv such as each of the video signals, a horizontal synchronizing frequency, a vertical synchronizing frequency, a polarity of a horizontal synchronizing component, a polarity of a vertical synchronizing component, a distinction between an interlaced scanning and a non-scanning and the like.

The retrieval section 22 successively compares the video characteristic parameters Pv1 to Pv5 being supplied when any change discriminated by the discriminator 21 with the video characteristic parameters (Pa1 to Pa5) to (Pd1 to Pd5) stored in advance to specify classifications of the video signals Sv in which all of these video characteristic parameters (Pa1 to Pa5) to (Pd1 to Pd5) have accorded with the video characteristic parameters Pv1 to Pv5 and outputs the signal identification codes IDa to IDd representing this specified classification.

The setting section 23 reads out the display characteristic parameters (Qa1 to Qa3) to (Qd1 to Qd3) (FIG.4) that correspond to each of these signal identification codes IDa to IDd respectively from the memory section of a display characteristic 32 to supply as the display characteristic parameters Qv1 to Qv3 to the indicator.

What are called these display characteristic parameters (Qa1 to Qa3) to (Qd1 to Qd3), Qv1 to Qv3 represent various parameters used for making the video signals Sv to be displayed accurately in the indicator 5.

Specifically, in the indicator 25 of FIG. 6 to be described later, these parameters are a frequency dividing ratio of the video signals Sv to the synchronizing signal component in the control circuit of a write/read timing 56, an adjustment value for the writing timing to a picture memory 54 of each of color signals R, G and B supplied from a video adjusting circuit 53, a horizontal trapping width of each of the color signals R, G and G into the picture memory 54, a vertical trapping width of each of the color signals R, G and B into the picture memory 54, an adjustment value for reading-out timing of each of the color signals R, G and B from the picture memory 54, a horizontal display width in a control circuit of a display element 58 when a control circuit of an adjusting element 57 reads out each of the color signals R, G and B from the picture memory 54, a vertical display width in the control circuit of the display element 58 when the control circuit of an adjusting element 57 reads out each of the color signals R, G and B from the picture memory 54 and the like.

Herein as one example, frequency dividing ratios of the video signals Sv to the synchronizing signal components are to be used as the display characteristic parameters Qa1 to Qa3 and Qv1, the horizontal display widths in the control circuit of the display element 58 as the display characteristic parameters Qa2 to Qd2 and Qv2, the vertical display widths in the control circuit of the display element 58 as the display characteristic parameters Qa3 to Qd3 and Qv3 respectively.

Now coming back to FIG. 2, the communication interface section 24 intercommunicates the signal identification codes IDa to IDd via the communication interface sections 61 and 62 to the other video display apparatuses 11 to 13.

The memory section 3 further includes a memory section of a video characteristic 31 and a memory section of a display characteristic 32.

Figure 3:
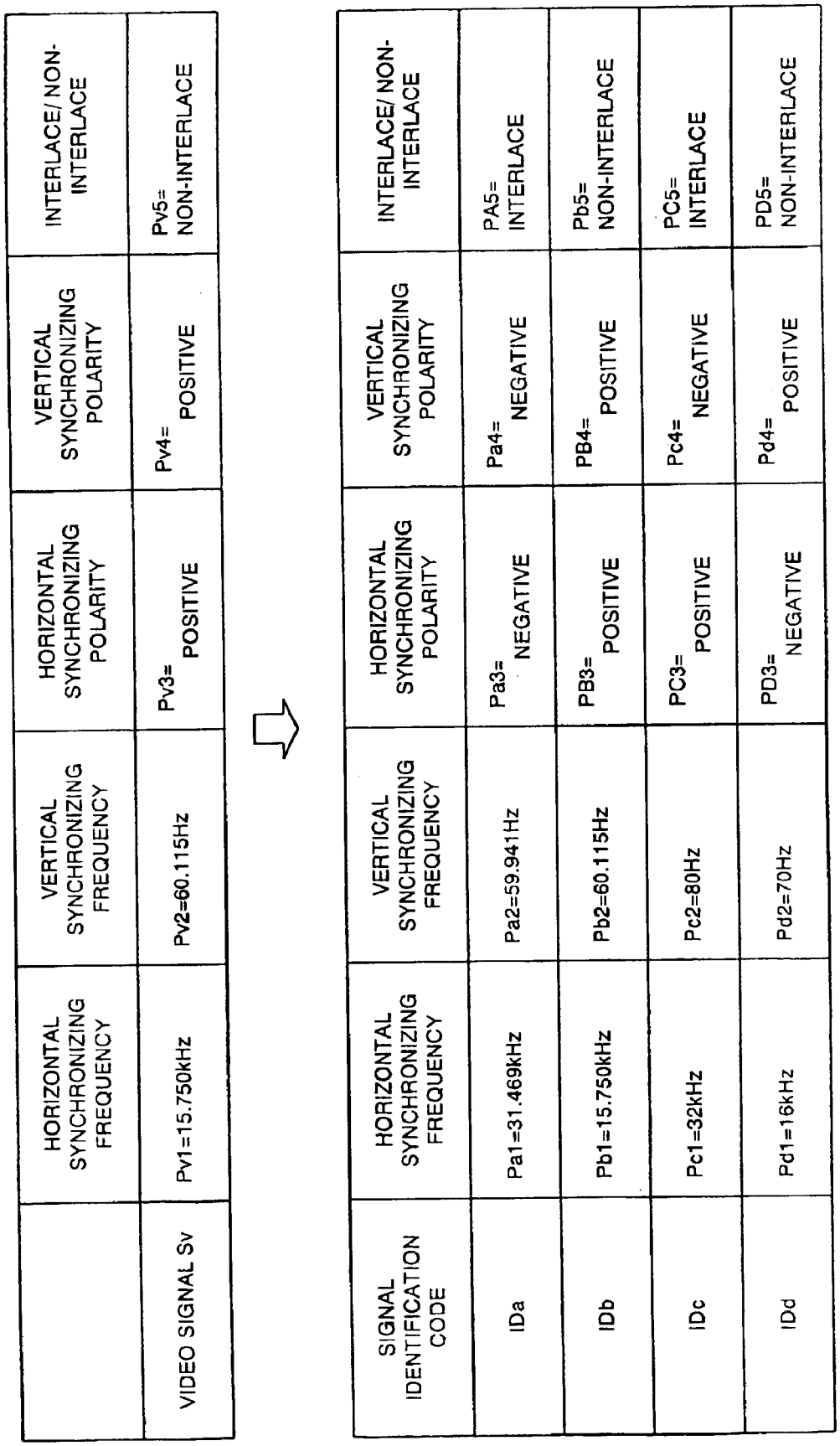
FIG. 3 is a drawing illustrating a concept for storing data in the memory section of video characteristics in the video display system in accordance with the embodiment of FIG. 1.

FIG. 3 is a drawing illustrating a concept for storing data in the memory section of a video characteristic in the video display system in accordance with the embodiment of FIG. 1. The memory section of a video characteristic 31 comprises a memory circuit and the like in which, as shown in FIG. 3, the video characteristic parameters (Pa1 to Pa5) to (Pd1 to Pd5) are stored in advance for specifying the video signals in correspondence to the signal identification codes IDa to IDd that are the codes attached to every classification of the video signals being likely supplied respectively.

Figure 4:
FIG. 4 is a drawing illustrating a concept for storing data in the memory section of display characteristics in the video display system in accordance with the embodiment of FIG. 1.

FIG. 4 is a drawing illustrating a concept for storing data in the memory section of a display characteristic in the video display system in accordance with the embodiment of FIG. 1. The memory section of a display characteristic 32 comprises a memory circuit and the like in which, as shown in FIG. 4, the display characteristic parameters (Qa1 to Qa3) to (Qd1 to Qd3) necessary for displaying the video signals in correspondence to each of the signal identification codes IDa to IDd respectively are stored in advance.

Figure 5:
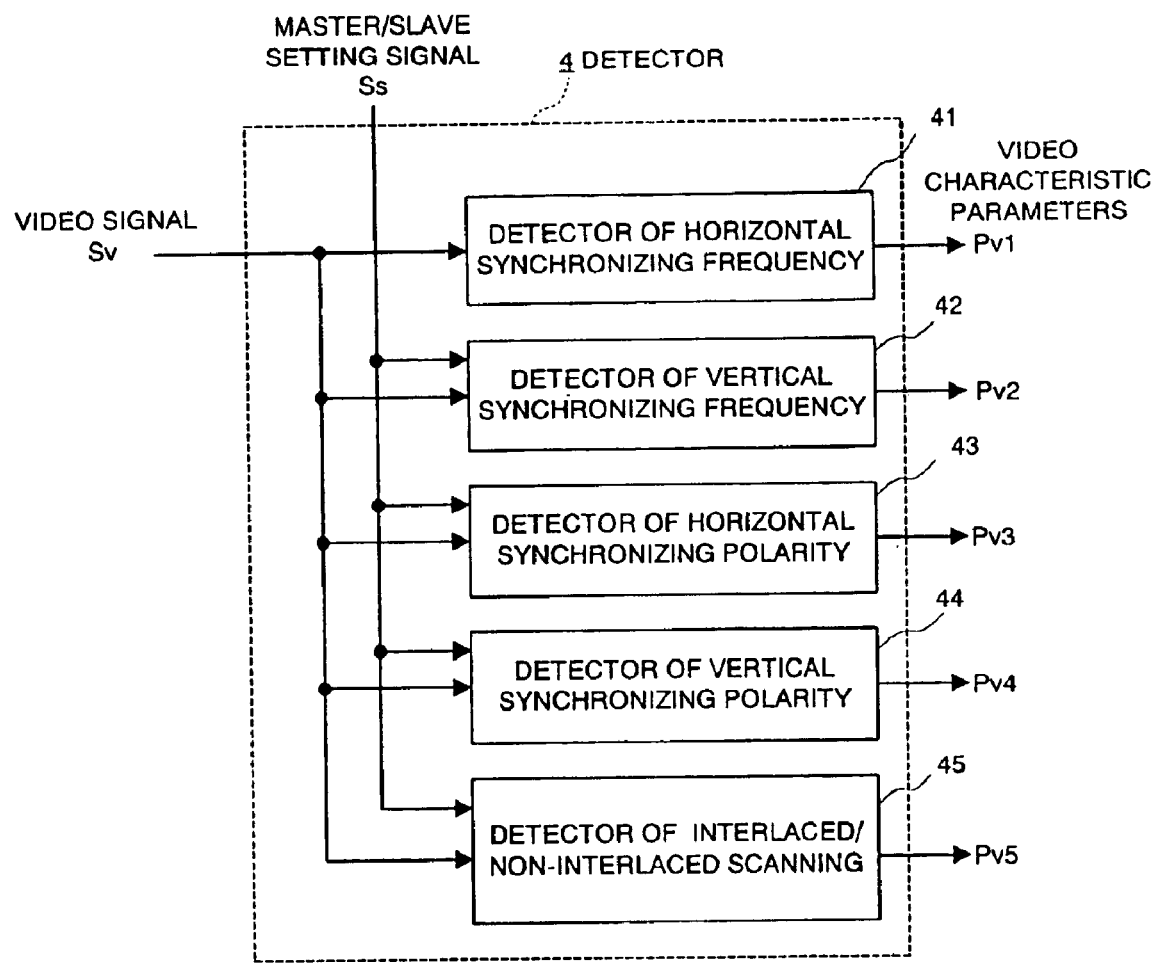
FIG. 5 is a circuit block diagram illustrating a detector in the video display system in accordance with the embodiment of FIG. 1.

FIG. 5 is a circuit block diagram illustrating the detector in the video display system in accordance with the embodiment of FIG. 1. The detector 4 shown in FIG. 5 comprises a detector of a horizontal synchronizing frequency 41, a detector of a vertical synchronizing frequency 42, a detector of a horizontal synchronizing polarity 43, a detector of a vertical synchronizing polarity 44 and a detector of an interlaced scanning and a non-interlaced scanning 45.

The detector of a horizontal synchronizing frequency 41 detects a horizontal synchronizing frequency of the video signal Sv being supplied to output as the video characteristic parameter Pv1.

The detector of a vertical synchronizing frequency 42 detects a vertical synchronizing frequency of the video signal Sv being supplied to output as the video characteristic parameter Pv2.

The detector of a horizontal synchronizing polarity 43 detects a polarity of the horizontal synchronizing component of the video signal Sv being supplied to output as the video characteristic parameter Pv3.

The detector of a vertical synchronizing polarity 44 detects a polarity of the vertical synchronizing component of the video signal Sv being supplied to output as the video characteristic parameter Pv4.

The detector of an interlaced scanning and a non-interlaced scanning 45 detects a distinction between an interlaced scanning and a non-interlaced scanning of the video signal Sv being supplied to output as the video characteristic parameter Pv5.

Each of these detectors 41 to 45 to which the master/slave set signal Ss have been already supplied from the user interface section 7 allows outputting the display characteristic parameters Pv1 to Pv4 in case these video display apparatuses 11 to 13 are set at the master apparatus and stops outputting them in case they are set at the slave apparatus contrarily.

Figure 6:
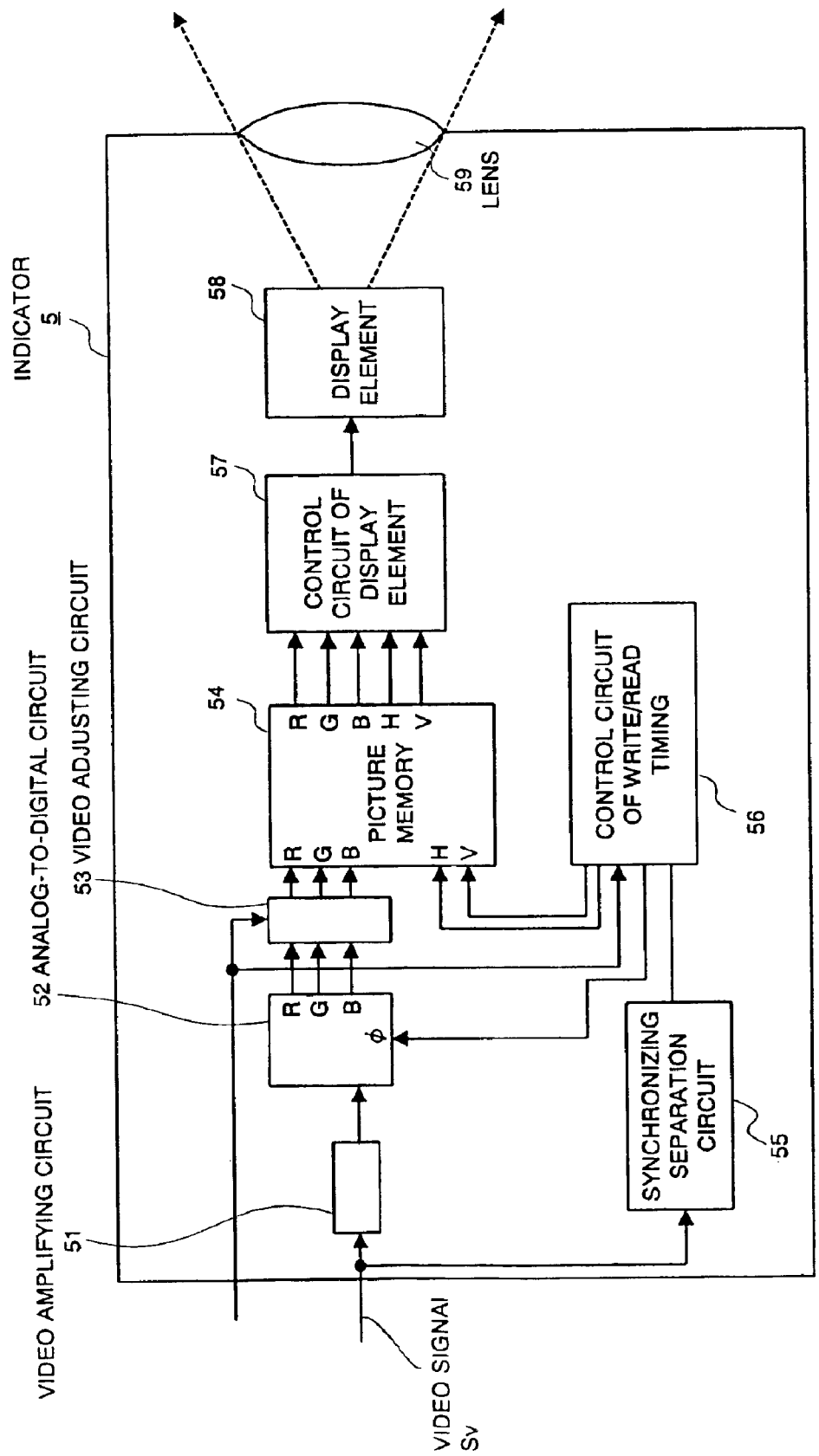
FIG. 6 is a circuit block diagram illustrating an indicator in the video display system in accordance with the embodiment of FIG. 1.

FIG. 6 is a circuit block diagram illustrating the indicator in the video display system in accordance with the embodiment of FIG. 1. The indicator 5 shown in FIG. 6 comprises a video amplifying circuit 51, an analog-to-digital converter 52, a video adjusting circuit 53, a picture memory 54, a synchronizing separation circuit 55, a control circuit of a write/read timing 56, a control circuit of an adjusting element 57, a control circuit of a display element 58 and a lens 59.

The video amplifying circuit 51 comprising a video buffer amplifier and the like amplifies the supplied video signals Sv to output.

The analog-to-digital converter 52 samples the video signal Sv from the video amplifying circuit 51 to convert the analog signal into the digital form and outputs each of the sampling data R,G and B that correspond to three color primaries of red, green and blue.

The video adjusting circuit 53 containing memory means that comprise a plurality of resisters (not shown) and the like for storing set values such as brightness, contrast and like respectively for adjusting video supplied from the setting section 23 (FIG. 2) adjusts brightness, contrast and the like on the sampling data R,G and B from the analog-to-digital converter 52 based on the set values stored in a plurality of these registers to output.

The picture memory 54 stores the sampling data R, G, and B from the video adjusting circuit 53 and a horizontal scanning signal H and a vertical scanning signal V from the control circuit of a write/read timing 56.

The synchronizing separation circuit 55 separates the synchronizing signal component from the supplied video signal to output.

The synchronizing separation circuit 56 doubles a frequency of the synchronizing signal component from the synchronizing separation circuit 55 to produce a dot clock to adjust a scanning period in correspondence to the set values of the display widths supplied from the setting section 23 (FIG. 2) that are in a horizontal direction and a vertical direction in the control circuit of a display element 58 and generates the horizontal scanning signal H and the vertical scanning signal V to output.

The control circuit of an adjusting element 57 to which are supplied the sampling data R, G and B, the horizontal scanning signal H and the vertical scanning signal V read out from the picture memory 54 drives the control circuit of a display element 58 for display.

The control circuit of a display element 58 that comprises the various display elements such as the CRT, the LCD, the PDP, the DMD and the like is driven by the control circuit of an adjusting element 57 to display the video signals Sv as video.

The lens 59 expands video displayed on the control circuit of a display element 58 to project.

Figure 7:
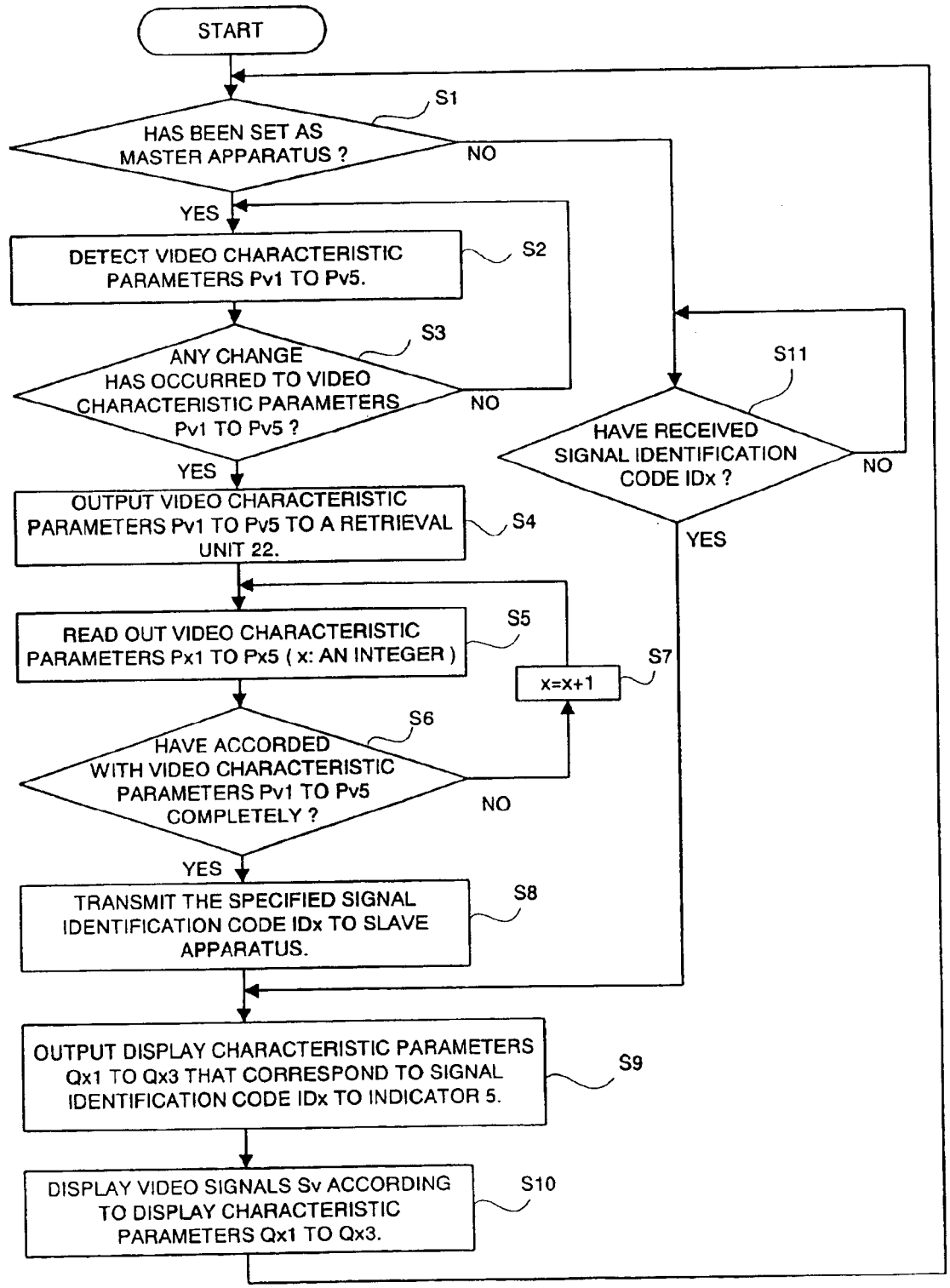
FIG. 7 is a float chart illustrating a processing in the video display system in accordance with the embodiment of FIG. 1.
Figure 8A:
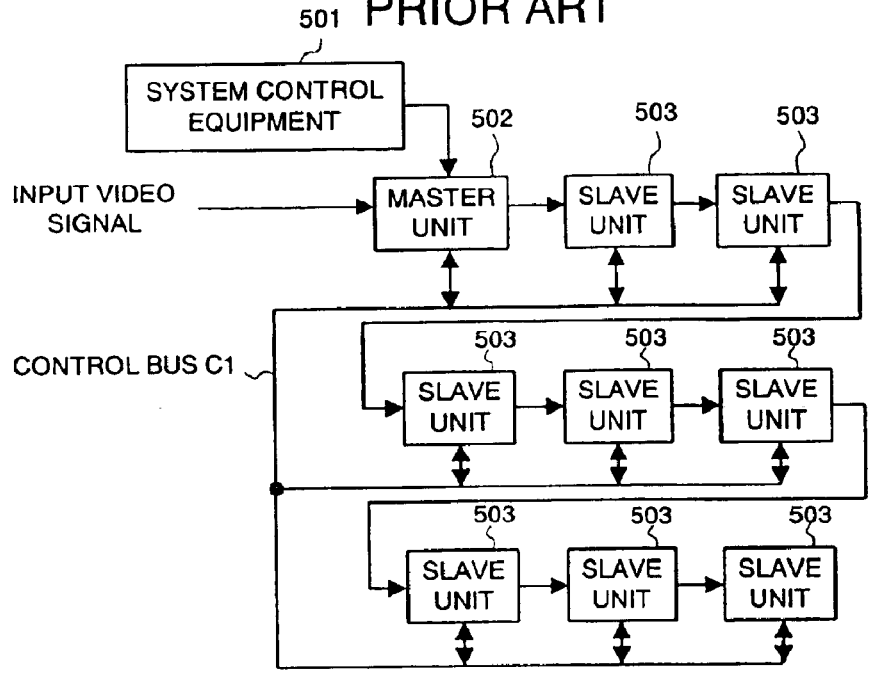
FIG. 8A is an entire circuit block diagram illustrating the multi-panel display system according to the example of the prior art.
Figure 8B:
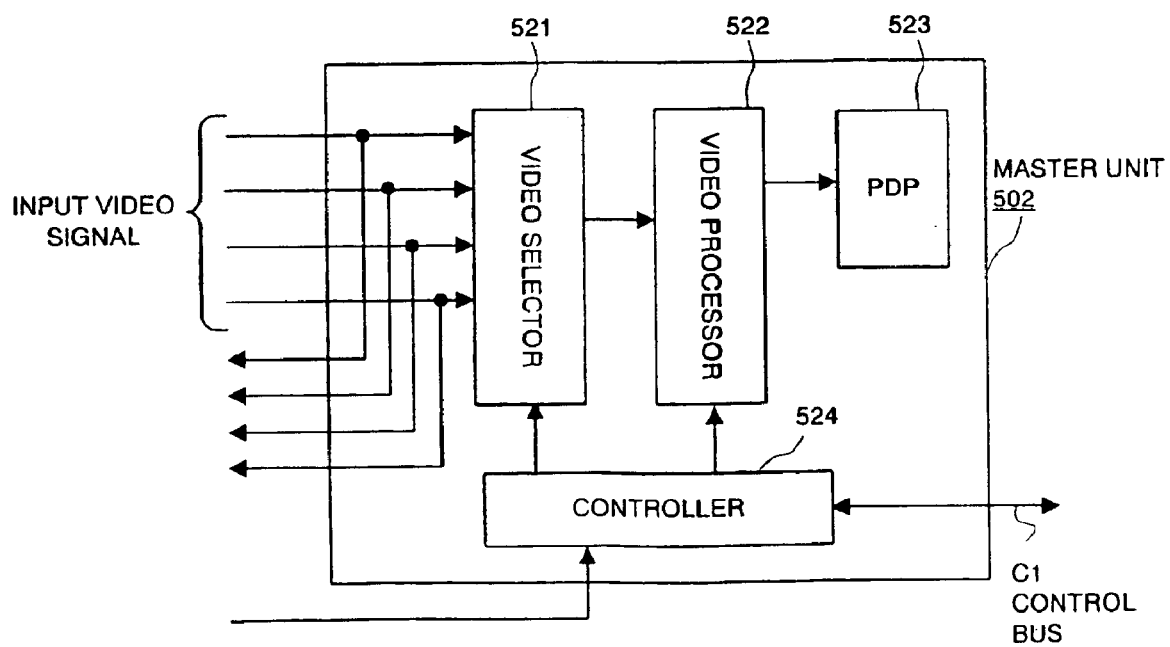
FIG. 8B is a circuit block diagram illustrating a master unit in the multi-panel display system of FIG. 8A

Next, an operation of the system will now be described. FIG. 7 is a float chart illustrating the processing in the video display system in accordance with the embodiment of FIG. 1.

In FIG. 1, when the video signals Sv are supplied to the first video display apparatus 11, the video signals Sv are supplied to the second video display apparatus 12 via the video cable 301 from the first video display apparatus 11. Furthermore, the video signals Sv are supplied to the third video display apparatus 13 via the video cable 302 from the second video display apparatus 12.

In FIG. 2, the user interface section 7 of anyone of the first to video display apparatuses 11 to 13, herein the user interface section 7 of the first video display apparatus 11, is selected as a master apparatus (Step S1).

The video signals Sv supplied to the first video display apparatus 11 that is to be the master apparatus are supplied to the output section 8 and the detector 4.

The output section 8 amplifies the supplied video signals Sv to output. These output video signals are supplied to the second and the third video display apparatuses 12 and 13 that are to be the slave apparatuses.

The detector 4 detects the display characteristic parameters Pv1 to Pv5 of the supplied video signals Sv respectively to output (Step S2). However, the detectors of the second and the third video display apparatuses 12 set at the slave apparatuses in the user interface section 7 is forced to stop outputting the display characteristic parameters Pv1 to Pv5.

The discriminator 21 detects the supplied video characteristic parameters Pv1 to Pv5 respectively to output theses video characteristic parameters Pv1 to Pv5 to the retrieval section 22 (Step S4) when any change has been detected in at least one of these video characteristic parameters Pv1 to Pv5 (Step S3).

The retrieval section 22 successively reads out the video characteristic parameters (Pa1 to Pa5) to (Pd1 to Pd5)Pv1 (FIG. 3) that are stored in advance in the memory section of a video characteristic 31 on each of the signal identification codes IDa to IDd (Step S5) to compare with the supplied video characteristic parameters Pv1 to Pv5 (Step S6).

Herein, the video characteristic parameters Pv1 to Pv5 and the video characteristic parameters Pa1 to Pa5 do not accord respectively (Step S6), and so the retrieval section 22 reads out the video characteristic parameters Pb1 to Pb5 of the next signal identification code IDb to compare whether all of the video characteristic parameters Pv1 to Pv5 and the video characteristic parameters Pa1 to Pa5 accord (Step S6).

Herein, all the video characteristic parameters Pv1 to Pv5 and the video characteristic parameters Pa1 to Pa5 accord respectively (Step S6), and so the retrieval section 22 supplies the specified signal identification code IDb to the communication interface section 24. The communication interface section 24 outputs this signal identification code IDb via the communication interface section 62 (Step S8). Furthermore, the retrieval section 22 outputs the identification code IDb to the setting section 23.

The setting section 23 reads out the display characteristic parameters Qb1 to Qb3 that are stored in correspondence to this identification code IDb from the memory section of a display characteristic 32 to output as the display characteristic parameters Qv1 to Qv3 (Step S9).

The indicator 5 sets the display characteristic parameters Qv1 to Qv3 supplied from the setting section 23 to the supplied video signals Sv to display video (Step S10). Herein, as shown in FIG. 6, the display characteristic parameter Qv1 (FIG. 4) representing a frequency dividing ratio of the video signal Sv to the synchronizing signal component is set to the control circuit of a write/read timing 56, the display characteristic parameter Qv2 (FIG. 4) representing the display width of the video signal Sv that is in the horizontal direction in the control circuit of a display element 58 to the control circuit of an adjusting element 57 and the display characteristic parameter Qv3 (FIG. 4) representing the display width of the video signal Sv that is in the vertical direction in the control circuit of a display element 58 to the control circuit of an adjusting element 57 respectively to display.

Additionally, the second and third video display apparatus 12 and 13 that have been set as the slave apparatuses (Step S1) as shown in FIG. 1 wait until they receive the signal identification codes IDa to IDd from the first video display apparatus 11 set as the master apparatus (Step S11).

As shown here in FIG. 2, when the communication interface section 61 receives the specified signal identification code IDb from the first video display apparatus 11, this signal identification code IDb is supplied to the communication interface section 24.

The communication interface sections 24 of the second and the third video display apparatuses 12 and 13 supply the supplied signal identification code IDd to the setting section 23.

The setting sections 23 of the second and the third video display apparatuses 12 and 13 read out from the memory section of a display characteristic 32 the display characteristic parameters Qb1 to Qb3 that are stored in correspondence to this signal identification code IDb (FIG. 4) to output as the display characteristic parameters Qv1 to Qv3 (FIG. 4) (Step S9).

The indicator 5 sets the display characteristic parameters Qv1 to Qv3 supplied from the setting section 23 to the supplied video signal Sv (Step S10).

In the embodiment of the present invention as described above, the video display apparatuses that is to be the slave apparatuses display video according to the supplied signal identification code from the video display system that is to be the master apparatus.

By the way, in the foregoing embodiment of the present invention, anyone of the first to the third video display apparatuses is allowable to set as the master apparatus.

Furthermore, even though the case has been exemplified in which the two slave apparatuses exist, quantity thereof is optional.

Furthermore, the case is exemplified in which the video signals Sv being supplied to the second and the third video display apparatuses 12 and 13 that are to be the slave apparatuses are output from the output section 8 of the first and the second video display apparatuses 11 and 12 described in the preceding paragraph, but the video signals Sv from the output terminal of the input change-over switch 10 may be supplied in parallel to the first to the third video display apparatuses 11 to 13.

Furthermore, a specific value without any range is set to each of the video characteristic parameters (Pa1 to Pa5) to (Pd1 to Pd5) that are stored in said memory section of a display characteristic 32 respectively, but a value with a given range instead thereof may be set to them. Such a setting also enables discrimination when the video characteristic parameters (Pa1 to Pa5) to (Pd1 to Pd5) do not accord completely.

Furthermore, the master apparatus further may be provided with a function for adjusting the other display characteristics such as brightness, contrast and hue of video and the like in addition to a function for discriminating change in the classifications of the video signals Sv. Provision of such function makes the operation unnecessary that adjusts the display characteristics such as brightness, contrast, hue and the like in the master apparatus and in each of the slave apparatuses separately because only the master apparatus outputs the adjustment signals and each of the indicators of the slave apparatuses adjust the display characteristics according to the adjustment signal from the master apparatus, allowing maneuverability to improve greatly.

By employing the means as described above, the display control method of the video display system and the video display system in accordance with the present invention have the effects as described below.

That is, there is an advantage of being able to realize the video display with a high reliability in which difference neither occurs in the times until which video is displayed in all of the video display apparatuses, nor is video displayed in different display patterns in some video display apparatuses, thereby allowing all of video to be synchronized in the same display pattern.

The reason is that only the specific video display apparatus detects any change in the video signal being supplied and the remaining video display apparatuses follow instruction thereof simultaneously.

The entire disclosure of Japanese Patent Application no. 2000-089411 filed on Mar. 28, 2000 including specification, claims, drawings and summary are incorporated herein by reference in its entirety.

What is claimed is:

1. A display control method for a video display system that comprises a plurality of video display apparatuses for displaying video signals being supplied as video, the display controlling method including:
   a step in which a specific video display apparatus out of said plurality of video display apparatuses is selected as a master display apparatus and the other of said plurality of display apparatuses is selected as slave apparatuses;
   a step in which said specific video display apparatus discriminates video characteristics of said video signals to output identification signals that correspond to said discriminated video characteristics and simultaneously displays said video signals according to display characteristics stored in correspondence to said identification signals; and
   a step in which said other video display apparatuses than said specific video display apparatus display said video signals according to said display characteristics stored in correspondence to said identification signals,
   wherein said identification signals include corresponding signals regarding a frequency dividing ratio, a timing of writing into a video memory, a timing of reading from the video memory, a horizontal display width and a vertical display width at the moment of making a display, a horizontal synchronization frequency and a vertical synchronizing frequency of the input signal, polarity information of the vertical and horizontal synchronization signal, and a classification of the interlaced scanning and non-interlaced scanning.

2. The display control method for said video display system as claimed in claim 1, wherein said video display apparatuses including:
   a step for detecting said display characteristics of said video signals;
   a step for reading out said identification signals that correspond to said detected video characteristics from a memory in which said video characteristics
   that is to be judgment criterion and said identification signals have been stored correspondingly;
   a step for reading out said display characteristics that correspond to said identification signals read out from said memory in which said identification signals and said display characteristics have been stored correspondingly; and
   a step for displaying said video signals according to said read out display characteristics.

3. The display control method for said video display system as claimed in claim 2, wherein said step for displaying includes;
   a step for sampling said video signals to output as each of color signals;
   a step for storing in a picture memory each of said sampled color signals;
   a step for producing horizontal scanning signals and vertical scanning signals based on synchronizing signal components of said video signals to output to said picture memory;
   a step for reading out said each of color signals, said horizontal scanning signals, and said vertical scanning signals to produce drive signals; and
   a step for displaying video based on said drive signals.

4. The display control method for said video display system as claimed in claim 3, wherein a step for performing video adjustment for said each of color signals is further included between said step for sampling said video signals and said step for storing in said picture memory.

5. The display control method for said video display system as claimed in claim 3, wherein said video characteristics are writing timings of said video signals to said picture memory.

6. The display control method for said video display system as claimed in claim 3, wherein said video characteristics are trapping widths of said video signals that are in a horizontal direction into said picture memory.

7. The display control method for said video display system as claimed in claim 3, wherein said video characteristics are trapping widths of said video signals that are in a vertical direction into said picture memory.

8. The display control method for said video display system as claimed in claim 3, wherein said video characteristics are read-out timings of said video signals from said picture memory.

9. The display control method for said video display system as claimed in claim 3, wherein said video characteristics are display widths that are in a horizontal direction when said video signals are displayed.

10. The display control method for said video display system as claimed in claim 3, wherein said video characteristics are display widths that are in a vertical direction when said video signals are displayed.

11. The display control method for said video display system as claimed in claim 1, wherein said video characteristics are horizontal synchronizing frequencies of said video signals.

12. The display control method for said video display system as claimed in claim 1, wherein said video characteristics are vertical synchronizing frequencies of said video signals.

13. The display control method for said video display system as claimed in claim 1, wherein said video characteristics are polarities of horizontal synchronizing components of said video signals.

14. The display control method for said video display system as claimed in claim 1, wherein said video characteristics are polarities of vertical synchronizing components of said video signals.

15. The display control method for said video display system as claimed in claim 1, wherein said video characteristics are distinctions between an interlaced scanning and a non-interlaced scanning in said video signals.

16. The display control method for said video display system as claimed in claim 1, wherein said video characteristics are frequency dividing ratios of said video signals to a synchronizing signal components.

17. A video display system comprising a plurality of video display apparatuses for displaying video signals being supplied as a video comprising:
   an user interface selection means for selecting one of said plurality of the video display apparatuses as a master display apparatus;
   each of said plurality of display apparatuses includes,
   a discriminator for discriminating the video characteristics of said video signals to output identification signals that correspond to the discriminated video characteristics;
   a controller for displaying said video signals according to the video display characteristics stored in correspondence to said identification signals, and wherein said discriminator only discriminates the video characteristics when its display apparatus is selected as the master display apparatus, and wherein said other video display apparatuses displays said video signals according to said display characteristics stored within memory in correspondence to said identification signals received from the master display apparatus and said identification signals corresponding signals regarding a frequency dividing ratio, a timing of writing into a memory, a timing of reading from the video memory, a horizontal display width and a vertical display width at the moment of making a display, a horizontal synchronization frequency and a vertical synchronizing frequency of the input signal, polarity information of the vertical and horizontal synchronization signal, and a classification of the interlaced scanning and non-interlaced scanning.

18. The video display system as claimed in claim 17, wherein each of said plurality of video display apparatuses includes:
   a detector for detecting said video characteristics of said video signals;
   a memory section of a video characteristic in which said video characteristics that are to be judgment criterion and said identification signals have been stored correspondingly;
   a memory section of a display characteristic in which said identification signals and said display characteristics have been stored correspondingly;
   a display controller for discriminating said identification signals that correspond to said video characteristics detected in said detector in reference to said memory section of a video characteristic to read out said display characteristics that correspond to said discriminated identification signals in reference to said memory section of a display characteristic; and
   a indicator for displaying said video signals according to said display characteristics read out in said display controller.

19. The video display system as claimed in claim 18, wherein said indicator includes;
   a analog-to-digital converter for sampling said video signals to output as each of color signals;
   a picture memory for storing each of said sampled color signals in said analog-to-digital converter;
   a control circuit of a write/read timing for producing horizontal scanning signals and vertical scanning signals based on synchronizing signal components of said video signals to output to said picture memory;
   a control circuit of a display element for reading out each of said color signals, said horizontal scanning signals and said vertical scanning signals to produce drive signals; and
   a display element for displaying said video based on said drive signals.

20. The video display system as claimed in claim 19, wherein a video adjusting circuit for performing video adjustment for each of said color signals is further included between said analog-to-digital converter and said picture memory.

21. The video display system as claimed in claim 19, wherein said video characteristics are writing timings of said video signals from said picture memory.

22. The d video display system as claimed in claim 19, wherein said video characteristics are display widths that are in a horizontal direction when said video signals are displayed.

23. The video display system as claimed in claim 19, wherein said video characteristics are trapping widths of said video signals that are in a vertical direction into said picture memory.

24. The video display system as claimed in claim 19, wherein said video characteristics are read-out timings of said video signals from said picture memory.

25. The video display system as claimed in claim 17, wherein said video characteristics are horizontal synchronizing frequencies of said video signals.

26. The video display system as claimed in claim 17, wherein said video characteristics are vertical synchronizing frequencies of said video signals.

27. The video display system as claimed in claim 17, wherein said video characteristics are polarities of horizontal synchronizing components of said video signals.

28. The video display system as claimed in claim 17, wherein said video characteristics are polarities of vertical synchronizing components of said video signals.

29. The video display system as claimed in claim 17, wherein said video characteristics are distinctions between an interlaced scanning and a non-interlaced scanning of said video signals.

30. The video display system as claimed in claim 17, wherein said video characteristics are frequency dividing ratios of said video signals to synchronizing signal components.

31. The video display system as claimed in claim 17, wherein said video characteristics are display widths that are in a horizontal direction when said video signals are displayed.

32. The video display system as claimed in claim 17, wherein said video characteristics are display widths that are in a vertical direction when said video signals are displayed.

33. A video display system comprising a plurality of video display apparatuses for displaying video signals being supplied as video,
   wherein each of said plurality of video display apparatuses includes:
   a detector for detecting video characteristics of said video signals;
   a memory section of a video characteristic in which said video characteristics that are to be criteria and said identification signals have been stored correspondingly;
   a memory section of a display characteristic in which said identification signals and said display characteristics have been stored correspondingly;
   a display controller for discriminating said identification signals that correspond to said video characteristics detected in said detector in reference to said memory section of a video characteristic to read out said display characteristics that correspond to said detected identification signals in reference to said memory section of a display characteristic; and
   an indicator for displaying said video signals according to said display characteristics read out in said display controller,
   wherein a specific video display apparatus out of said plurality of video display apparatuses detects said video characteristics of said video signals by said detector and read out said identification signals that correspond to said detected video characteristics from said memory section of a display characteristic to output to said other video display apparatuses and simultaneously displays said video signals according to the display characteristics stored in correspondence to said identification signals, and wherein said other apparatuses read out said display characteristics that correspond to said identification signals output from said the memory section of a display characteristic to display said video signals according to these display characteristics.

34. The video display system as claimed in claim 33, wherein said indicator includes;
- a analog-to-digital converter for sampling said video signals to output as each of color signals;
- a picture memory for storing each of said sampled color signals in said analog-to-digital converter;
- a control circuit of a write/read timing for producing horizontal scanning signals and vertical scanning signals based on synchronizing signal components of said video signals to output to said picture memory;
- a control circuit of a display element for reading out each of said color signals, said horizontal scanning signals and said vertical scanning signals to produce drive signals; and
- a display element for displaying said video based on said drive signals.

35. The video display system as claimed in claim 34, wherein a video adjusting circuit for performing video adjustment for each of said color signals is farther included between said analog-to-digital converter and said picture memory.

36. The video display system as claimed in claim 33, wherein said video characteristics are horizontal synchronizing frequencies of said video signals.

37. The video display system as claimed in claim 33, wherein said video characteristics are vertical synchronizing frequencies of said video signals.

38. The video display system as claimed in claim 33, wherein said video characteristics are polarities of horizontal synchronizing components of said video signals.

39. The video display system as claimed in claim 33, wherein said video characteristics are polarities of vertical synchronizing components of said video signals.

40. The video display system as claimed in claim 33, wherein said video characteristics are distinctions between an interlaced scanning and a non-interlaced scanning of said video signals.

41. The video display system as claimed in claim 33, wherein said video characteristics are frequency dividing ratios of said video signals to synchronizing signal components.

42. The video display system as claimed in claim 33, wherein said video characteristics are writing timings of said video signals from said picture memory.

43. The video display system as claimed in claim 33, wherein said video characteristics are display widths that are in a horizontal direction when said video signals are displayed.

44. The video display system as claimed in claim 33, wherein said video characteristics are trapping widths of said video signals that are in a vertical direction into said picture memory.

45. The video display system as claimed in claim 33, wherein said video characteristics are read-out timings of said video signals from said picture memory.

46. The video display system as claimed in claim 33, wherein said video characteristics are display widths that are in a horizontal direction when said video signals are displayed.

47. The video display system as claimed in claim 33, wherein said video characteristics are display widths that are in a vertical direction when said video signals are displayed.

* * * * *